United States Patent
Smith et al.

(10) Patent No.: US 9,787,002 B1
(45) Date of Patent: Oct. 10, 2017

(54) SEALED ELECTRIC TERMINAL ASSEMBLY

(71) Applicant: DELPHI TECHNOLOGIES, INC., Troy, MI (US)

(72) Inventors: Robert A. Smith, Murrysville, PA (US); George Albert Drew, Warren, OH (US); Gina Sacco, Warren, OH (US); Sean P. Krompegel, Canfield, OH (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/196,326

(22) Filed: Jun. 29, 2016

(51) Int. Cl.
  *H01R 4/48* (2006.01)
  *H01R 4/18* (2006.01)
  *H01R 4/70* (2006.01)
  *H01R 43/048* (2006.01)

(52) U.S. Cl.
  CPC ............. *H01R 4/185* (2013.01); *H01R 4/70* (2013.01); *H01R 43/048* (2013.01)

(58) Field of Classification Search
  CPC ........ H01R 4/185; H01R 43/048; H01R 4/70; H01R 13/6658; H02S 40/34; C07D 233/64
  USPC ......................................................... 439/866
  See application file for complete search history.

(56) References Cited

U.S. PATENT DOCUMENTS

| | | |
|---|---|---|
| 5,320,250 A | 6/1994 | La et al. |
| 5,747,102 A | 5/1998 | Smith et al. |
| 6,253,957 B1 | 7/2001 | Messerly et al. |
| 6,380,278 B1 | 4/2002 | Fan et al. |
| 6,472,069 B1 | 10/2002 | Bailey et al. |
| 6,559,260 B1 | 5/2003 | Fan et al. |
| 2003/0149179 A1 | 8/2003 | Chao et al. |
| 2004/0054798 A1 | 3/2004 | Frank et al. |
| 2004/0063026 A1* | 4/2004 | Barr ............... C07D 233/64 430/270.1 |
| 2005/0154121 A1 | 7/2005 | Fan et al. |
| 2009/0264011 A1* | 10/2009 | Wang ............. H01R 13/6658 439/507 |
| 2012/0048615 A1* | 3/2012 | Masumoto ........... H02S 40/34 174/547 |
| 2015/0360498 A1* | 12/2015 | Mizuno ............... G03C 1/685 252/600 |
| 2016/0089681 A1 | 3/2016 | Saidman et al. |

* cited by examiner

*Primary Examiner* — Jean F Duverne
(74) *Attorney, Agent, or Firm* — Robert J. Myers

(57) ABSTRACT

A wire terminal assembly is disclosed for a cable conductive core of a first metal core. A conductive terminal of a second metal is connected to the conductive cable core along a conductive connection interface. A coating is disposed over the conductive connection interface. The coating includes the free radical addition polymerizate of a coating composition of: (1) an oligomer comprising at least two active unsaturated bonds, and (2) an acrylic monomer.

20 Claims, 1 Drawing Sheet

SEALED ELECTRIC TERMINAL ASSEMBLY

BACKGROUND

The field of this disclosure relates to an electrical connection between a cable and a terminal.

Cable terminal connections are commonly used to facilitate electrical connections between various electrical or electronic components and sub-components. The designs are myriad, and common features include a physical and electrically-conductive connection between a terminal and an electrically-conductive cable core. It is sometimes desirable to seal this electrically-conductive connection against outside contaminants such as dirt and moisture in order to maintain the integrity of the electrically-conductive connection.

Conductive cable cores and terminals are commonly made of conductive metal(s). Interest in weight savings and cost savings in various applications such as automotive electrical wiring applications have made aluminum based cables an attractive alternative to copper based cables. However, some wiring and electrical connectors may remain copper based. Thus, there may be a transition somewhere in the electrical circuit between an aluminum based portion of the circuit and a copper based portion of the circuit. Often this transition may occur at the terminal because the terminal may include copper (e.g., tin-plated copper) based for reasons of size and complexity of shape that can be more easily achieved with copper based materials over aluminum based materials. A crimp interface connection of metal cable core (e.g., aluminum) to a different metal terminal (e.g., copper) can produce galvanic corrosion at the interface of the metal of lower nobility if an electrolyte such as salt water is present.

Various materials and techniques have been proposed to protect from moisture at electric cable terminal connections. However, since even a small amount of exposed metal at the interface can result in significant galvanic corrosion in the presence of moisture, there continues to be a need for new approaches to providing robust terminal connections for electric wire and cable.

SUMMARY

In accordance with some embodiments, a wire terminal assembly comprises a conductive cable core that comprises a first metal. A conductive terminal comprising a second metal is connected to the conductive cable core along a conductive connection interface. A coating is disposed over the conductive connection interface. The coating comprises the free radical addition polymerizate of a coating composition comprising: (1) an oligomer comprising at least two active unsaturated bonds, and (2) an acrylic monomer.

In accordance with some example embodiments, a method is provided of making a wire terminal assembly comprising a conductive cable core comprising a first metal and a conductive terminal comprising a second metal. According to the method, the conductive terminal is connected to the conductive cable core along a conductive connection interface. A coating composition comprising: (1) an oligomer comprising at least two active unsaturated bonds and (2) an acrylic monomer, is deposited over the conductive connection interface and cured.

BRIEF DESCRIPTION OF DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
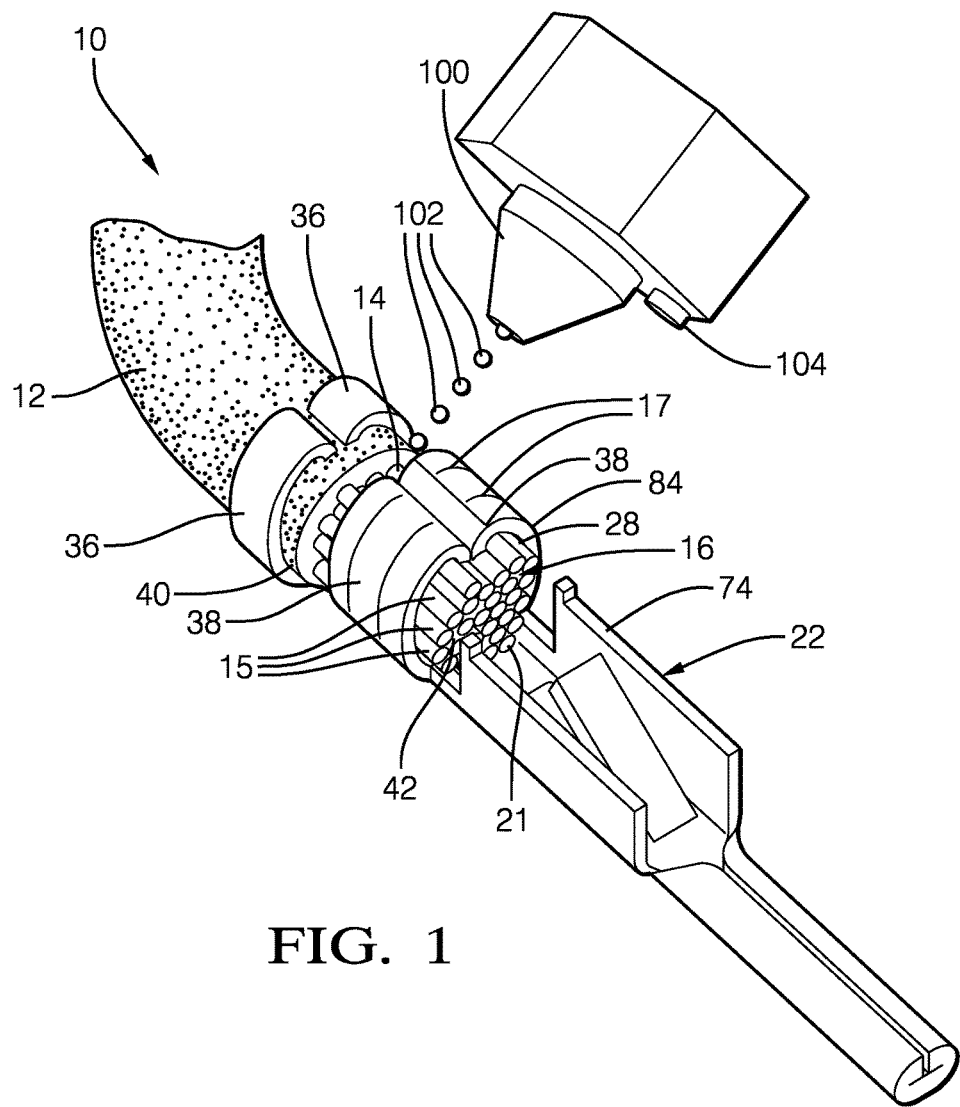
FIG. 1 is a schematic depiction in a perspective view of an example embodiment of a wire terminal assembly.

As mentioned above, a conductive connection interface between a conductive cable core and a conductive terminal is coated with a coating composition comprising an oligomer comprising at least two active double bonds. As used herein, an active double bond is a double bond that is reactive with free radical monomer units during free radical polymerization. Typically such double bonds are in end groups at a terminus of an oligomer backbone molecule, but can also be disposed in side groups appended to the oligomer. In some embodiments, the oligomer comprises an active double bond at each of the two termini of the oligomer backbone. In some embodiments, the oligomer can include one or more double bonds disposed in a side groups appended to the oligomer backbone. The implementation of side group double bonds allows for more than two active double bonds in the oligomer molecule, which can provide molecular branching loci in the polymerizate.

Oligomers can be assembled from conventional monomer building blocks as with polymers, but with process and ingredient controls used to control molecular weight (e.g., common techniques for controlling molecular weight growth include but are not limited to stoichiometric excess of one type of monomer for condensation reactions, use of monofunctional capping agents, polymerization catalyst quenchers, or reaction quenching processing such as a reduction of temperature). Oligomers and polymers are both characterized in the IUPAC Gold Book by their property of no significant change in properties by addition or removal of one or a few monomer units, and are distinguished by oligomers being of intermediate molecular mass and polymers being of high molecular mass. Although there is no universally-recognized bright line for molecular mass dividing oligomers from polymers, in some example embodiments, oligomers can have a degree of polymerization with a number of monomer units in a range having a low end of 5 monomer units, more specifically 10 monomer units, more specifically 20 monomer units, more specifically 50 monomer units, and even more specifically 100 monomer units, and an upper limit of 1000 monomer units, more specifically 500 monomer units, more specifically 200 monomer units, more specifically 150 monomer units, more specifically 125 monomer units, and even more specifically 100 monomer units. The above lower and upper range endpoints can be independently combined to disclose a number of different ranges. In some embodiments, the oligomer has a degree of polymerization of 100-500 monomer units.

In some embodiments, the oligomer can be a difunctionally-unsaturated urethane oligomer, such as a urethane methacrylate. Such oligomers can be formed from polyurethane monomer building blocks of polyisocyanates and polyols, with an unsaturated bond-containing mono-hydroxy compound (e.g., a hydroxyl-containing (meth)acrylate) acting as a capping agent with respect to the polycondensation urethane chain-building reaction. Examples of polyisocyanates include hexamethylene diisocyanate, isophorone diisocyanate, cyclohexane-1,4-diisocyanate, methylene bis(4-cyclohexylisocyanate), toluene diisocyanate, diphenylmethane 4,4-diisocyanate, xylene diisocyanate, 1,4-phenylene diisocyanate, diisocyanates and triisocyanates of HDI-based oligomers, and other aliphatic and aromatic isocyanates. Examples of polyols include diols such as ethylene glycol, propylene glycol, 1,3-propanediol, 1,2, 1,3 or 1,4 butanediols, 2-methyl-1,3-propane diol (MPDiol), neopentyl glycol (NPG), alkoxylated derivatives of such diols, polyether diols, polyester diols, and the like. Higher functional polyols can include trimethylol propane (TMP), PETA, di-TMP, di-PETA, glycerol, alkoxylated derivatives thereof, and the like. A mono-hydroxy-containing unsaturated compound such as a hydroxyl-containing (meth)acrylates can be used to provide the oligomer with a terminal group comprising an unsaturated bond. Examples of hydroxyl-containing (meth) acrylates are hydroxyethyl (meth)acrylate, hydroxypropyl (meth)acrylate, hydroxybutyl (meth)acrylate, trimethylolpropane mono- and di-(meth)acrylate, pentaerythritol mono-, di-, tri-(meth)acrylate, dipentaerythritol mono-, di-, tri-, tetra-, and penta-(meth)acrylate, neopentyl glycol (meth)acrylate, hexanediol mono(meth)acrylate, tris(2-hydroxyethyl)isocyanurate mono- and di(meth)acrylate, polypropylene glycol mono(meth)acrylate, polyethylene glycol mono (meth)acrylate, polypropylene/polyethylene glycol mono(meth)acrylate, polybutyl glycol mono(meth)acrylate, polytetramethylene glycol mono(meth)acrylate, hydroxy polycaprolacton mono(meth)acrylate, and ethoxylated and propoxylated derivatives thereof. The terminal group on the oligomer can also include unsaturated groups other than acrylate groups. For example, U.S. Pat. No. 6,559,260 discloses urethane oligomers terminated with allyl groups.

Urethane oligomers can be prepared with or without catalysts. In the case where catalyst is used, various different catalysts can be used. Catalyzed reactions are desirable due to the shortened reaction time and fewer by-products. Typical catalysts which may be used for this reaction are amines and metal-based catalysts. Some examples include dibutyltin dilaurate, 1,4-diazabicyclo[2.2.2]-octane (DABCO), 1,8-diazabicyclo-[5.4.0]-undec-7-ene (DBU), N,N-dimethylcyclohexylamine (DMCA), tetramethyltin, tetrabutyltin, tetraoctyltin, tributyltin chloride, dibutyltin dichloride, dimethyltin oxide, trimethyltin chloride, dimethyltin dichloride, trioctyltin chloride, dibutyltin oxide, dibutyltin diacetate, butyltin trichloride, dioctyltin dichloride, dioctyltin oxide, dioctyltin dilaurate, and dioctyltin diacetate. Zinc, iron, bismuth, and zirconium complexes similar to—those tin-based complexes set forth above could also be used as catalysts.

Urethane oligomers can be formed by reacting the polyol (s) with a molar excess of the polyisocyanate(s) followed by reacting the resultant isocyanato-terminated product with the hydroxy functional (meth)acrylate(s), or in an alternative method the polyisocyanate(s), hydroxy functional (meth) acrylate(s), and metal salt polyol(s) can be mixed and reacted in one step. In the condensation reaction, one can use between 0.5 and 2.0, preferably 0.75 and 1.5, more specifically between 0.9 and 1.1 equivalents of isocyanate for each equivalent of hydroxyl. In this manner, free alcohol or free isocyanates remaining in the final material can be avoided. The final, condensed product will include (meth)acrylate functionalities that can be cured with free radical mechanism such as peroxides or radiation curing processes.

In some embodiments, the oligomer can include aliphatic hydrocarbon chain segments of 4-10 carbon atoms, more specifically 6-8 carbon atoms. Such aliphatic segments can be incorporated into the oligomer chain through the monomer (e.g., C6 segments in hexamethylene diisocyanate, C5 segments in 1,5-pentanediol).

In some embodiments, the oligomer can include polyester segments. Such segments can be prepared in a polycondensation reaction of polyol with polyacid. Polyols useful in preparing polyesters for use in this invention are polyfunctional alcohols of the type conventionally utilized in polyester preparation. Such polyols include ethylene glycol, 1,5-propanediol, propylene glycol, triethylene glycol, butylene glycol, glycerol, diethylene glycol, 1,4,6-hexanetriol, trimethylolpropane, trimethylolethane, dipropylene glycol, pentaerythritol, neopentyl glycol, alkoxylated 2,2-bis(4-hydroxyphenyl) propane and the like. Although diols are generally utilized in the preparation of unsaturated polyesters, more highly functional polyols, i.e., polyols having a functionality of three to five, can also be used. In addition, a polyethylenically unsaturated monomer such as dicyclopentadiene or Bisphenol A dicyclopentadiene and derivatives thereof can be included. Examples of polycarboxylic acids optionally useful in preparing unsaturated polyesters used in this invention include phthalic acid, phthalic anhydride, isophthalic acid, tetrahydrophthalic acid, hexahydrophthalic acid, endomethylene tetrahydrophthalic acid, glutaric acid, tetrachlorophthalic acid, suberic acid, hexachloroendomethylene tetrahydrophthalic acid, sebacic acid, tetrahydrophthalic anhydride, succinic acid, adipic acid, and the like, wherein the term "acid" includes the corresponding anhydrides where such anhydrides exist. Terminal groups comprising unsaturated bonds can be provided with hydroxy (meth)acrylate chain terminators, or with unsaturated mono-acids, including but not limited to maleic acid, citraconic acid, fumaric acid, glutaconic acid, itaconic acid, chloromaleic acid, mesaconic acid, and the like, wherein the term "acid" is used to include the corresponding anhydrides where such anhydrides exist. Polyester molecules can be formed through known transesterification condensation reaction and catalyzation techniques. Aliphatic segments can be included in the polyacid (e.g., C8 segments in sebacic acid, C5 segments in 1,5-pentane diol).

In some embodiments, the oligomer can have both polyurethane and polyester segments. For example, a polyester diol can be prepared using the polyester-formation techniques and incorporated as part of the polyol reactant in forming a urethane oligomer such as a urethane acrylate oligomer.

Oligomers as described above are commercially available, and are described in various US patent references, including US published application nos. US 2004/0054798 A1, US 2003/0149179 A1, US 2005/0154121 A1, and U.S. Pat. No. 6,472,069, U.S. Pat. No. 6,559,260, U.S. Pat. No. 6,380,278, the disclosures of each of which are incorporated herein by reference in their entirety.

As mentioned above, the coating composition also includes an unsaturated bond-containing monomer. Examples of such monomers include, for example, alkyl (meth)acrylates; alkoxyalkyl (meth)acrylates; (meth)acrylonitrile; vinylidine chloride; styrenic monomers; alkyl and alkoxyalkyl fumarates and maleates and their half-esters, cinnamates; and acrylamides; N-alkyl and aryl maleimides (meth)acrylic acids; fumaric acids, maleic acid; cinnamic acid; and combinations thereof. In some embodiments, the monomer comprises a (meth)acrylate monomer or acrylic acid. More specifically, example monomers can include are not limited to any particular species but includes various monomers, for example: (meth)acrylic acid monomers such as (meth)acrylic acid, methyl(meth)acrylate, ethyl (meth)

acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth) acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth) acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, -(methacryloyloxypropyl)trimethoxysilane, (meth)acrylic acid-ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, .alpha.-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol, etc. The aforementioned monomers may be used singly, sequentially, or in combination. From the desirability of physical properties of products, one or more classes of monomer may be chosen for the coating composition to apply to the conductive connection interface. In some embodiments, the monomer includes one or more (meth)acrylates or acrylic acid.

Although this disclosure is not limited to or by any particular theory or mode of operation, it is believed that the oligomers can contribute to incorporation polymer segments in the resin matrix of the coating such as polyurethane segments and/or polyester segments that provide desirable coating properties such as water resistance, flexibility, temperature-resistance, etc., while the monomer can contribute adjustment of coating composition properties such as viscosity and adhesion to provide for proper deposition and flow of the coating composition to all desired areas of the substrate (without diluting the coating like a conventional solvent), and the addition polymerization during cure of both the oligomers and the monomers, with the presence of highly-reactive free radical species such as those produced during the polymerization of (meth)acrylates and/or acrylic acid, can contribute to adhesion to and integration of the coating with the substrate. Also, the macromolecule structures and the molecular weight distribution thereof, formed by bi-modal molecular weight distribution and other properties of the starting molecules, distributed between oligomeric chain length and monomer (single-unit) chain length, may provide unique polymeric protection to the conductive connection interface.

In some embodiments, the coating composition can have a viscosity at 40° C. in a range having a low limit of 100 cp, more specifically 200 cp, and more specifically 300 cp, and an upper limit of 4500 cp, more specifically 2500 cp, and more specifically 1500 cp. The above lower and upper range endpoints can be independently combined to disclose a number of different ranges. In some embodiments, the coating composition can have a viscosity of 300-1000 cp at 40° C. In some embodiments, the coating composition can have a viscosity of 200-800 cp at 40° C. The viscosity of the coating composition can be manipulated by varying the respective amounts of the oligomer and monomer, with lower viscosities promoted by higher proportions of monomer in the coating composition, and higher viscosities promoted by higher proportions of oligomer in the coating composition.

The respective amounts of oligomer and monomer in the coating composition can vary, depending on the target properties of the application process and the final coating. In some example embodiments, the composition can comprise at least 50 wt. % oligomer and less than 100 wt. % oligomer, and greater than 0 wt. % monomer and less than or equal to 50 wt. % monomer.

In some embodiments, the coated substrate can be treated with a corrosion-inhibiting oil, which can include conventional untreated mineral oils or a mineral oils with corrosion-inhibiting additives such as phosphates (e.g., zinc dithiophosphate). The oil can be applied by conventional means such as with a spray or brush. Examples of corrosion-inhibiting oils include conventional mineral oil and other commercially-available oils such as Ecoline 3690, Nye 531J, Nye 561J, or Richards Apex 562CPD. Application of the oil to the coated components can be made by various techniques, including but not limited to jet, spray, or tool-applied using tools such as brushes, sponges, or rollers.

Referring now to the Figures, FIG. 1 depicts an exemplary embodiment of a cable 10 having an insulative outer cover 12 and a conductive core 14 comprising a first metal, which can include metal alloys. The core 14 is depicted in FIG. 1 as comprising a grouping of individual strands 15 bundled and/or twisted together, but could also have other configurations such as a mono-element metal core. An end portion of an insulative outer cover 12 is removed to expose a lead 16 of core 14. A terminal 22, comprising a second metal has a rearward portion 84 including a pair of insulation crimp wings 36 and a pair of core crimp wings 38 with a notch or gap 40 therebetween. Wings 36 and 38 are crimped into a physical connection with cable 10 such that terminal 22 is secured to insulative outer cover 12 and makes electrical contact with lead 16 of core 14. Voids 42 may be formed between individual strands 15 of core 14 before or after terminal 22 is crimped onto cable 10. Core crimp wings 38 may optionally include serrations 17 to enhance the bite of core crimp wings 38 into the lead 16.

As further shown in FIG. 1, a coating applicator 100 can dispense a coating composition 102 at the interface of the lead 16 and the terminal 22. The coating applicator can be any type of applicator, including but not limited to one or more spray nozzles, brushes, rollers, or jet heads. In some embodiments, the spray applicator includes one or more jet heads. Jet applicators are known, and are described for example in U.S. Pat. Nos. 5,320,250; 5,747,102; and 6,253,957, and US Appl. Pub. No. 2016/0089681 A1, the disclosures of each of which are incorporated herein by reference in their entirety. In some embodiments, the jet head(s) can apply the coating composition while moving in a predetermined pattern above the terminal. The specific dispensing parameters can vary widely depending on the size and configuration of the terminal assembly being sealed. In some embodiments of interest, jet dispensing can be performed with a linear dispensing velocity in a range having a lower end of 0.1 mm/s, more specifically 5 mm/s, and even more specifically 10 mm/s, and an upper limit of 500 mm/s, more specifically 100 mm/s, and even more specifically 50 mm/s. In some embodiments of interest, the jet head(s) can dispense and apply fluid with a frequency range with a lower end of 1 Hz, more specifically 125 Hz, and an upper limit of 500 Hz, more specifically 250 Hz. In some embodiments of interest, the jet head(s) dispense numerous dots to form a uniform coating. In some embodiments, drop sizes between 2 nl and 2 ml, more specifically between 0.25 ml and 2 ml. The dispensing pulse can be set so that the valve is continually open, creating a steady stream with a maximum volume limited to the amount of material contained in the valve, e.g., 2 ml. In some embodiments, an actinic radiation source 104 such as an ultraviolet (UV) radiation source can be integrated with the coating applicator 100.

As mentioned above, the coating is applied to the conductive connection interface at any portion where it can be exposed to moisture. There may of course be some portions of the interface that are not directly coated (e.g., where a bit or gripping portion of the terminal wings 38 is deeply engaged into and sealed against the cable core 14 so that neither moisture nor the coating composition could penetrate); however, in some embodiments, the coating covers and seals all of the exposed portions conductive connection interface and adjoining exposed portions of the cable core and terminals. In some embodiments, the coating covers and seals all portions of the conductive cable core exposed outside of the insulating outer cover. As depicted in FIG. 1, the applicator 100 is applying the coating composition to the area of gap 40. In some embodiments of FIG. 1, the coating composition is applied to cover any one or combination or all of: the exposed portion of the conductive core 14 in the gap 40, the terminal wings 38, the interface 28 between the terminal wings 38 and the conductive core 14, a corresponding interface (not shown) between the terminal wings 38 and the conductive core 14 in the area of gap 40, and the exposed portion of the conductive core 14 protruding past the terminal wings 38 (including any voids 42 between strands 15, if present).

In some embodiments, the first and second metals can be the same or can be different alloys of the same metal. In some embodiments, the first and second metals can be different metals. In some embodiments, the coating is applied to seal an electrically conductive connection interface between metals having different electrode potentials (defined as the electromotive force of a cell in which the electrode on the left is a standard hydrogen electrode and the electrode on the right is the electrode in question) in order to provide protection against moisture penetration that can cause galvanic corrosion. The difference in electrode potential needed to cause galvanic corrosion can vary widely based on a number of factors such as salt content in the penetrating moisture, surface areas of the exposed metals, distance through the liquid electrolyte between the metals, temperature, etc. Electrode potential differences commonly associated with galvanic corrosion can range from 0.15 to 1.8 volts. Examples of metal pairings where difference in electrode potential can lead to galvanic corrosion include aluminum and copper (e.g., aluminum cable core and terminals of copper or tin-plated copper). In some embodiments, the terminal can be formed from a metal that is more noble than the cable core metal. In some embodiments, the terminal can be formed from a metal that is less noble than the cable core metal. In some embodiments, the first and second metals can have the same electrode potential or can be the same metal. In such embodiments, the applied coating can still seal against moisture that can cause oxidation, even if there is no potential for galvanic corrosion.

The coating composition can include various additives and coating aids, as known in the art. Additives and coating aids can include, but are not limited to, free radical initiators (e.g., UV activated free radical initiators), dyes (static or fluorescent), surfactants, thickeners, stabilizers, pigments, fillers, and other known coating additives.

Figure 2:
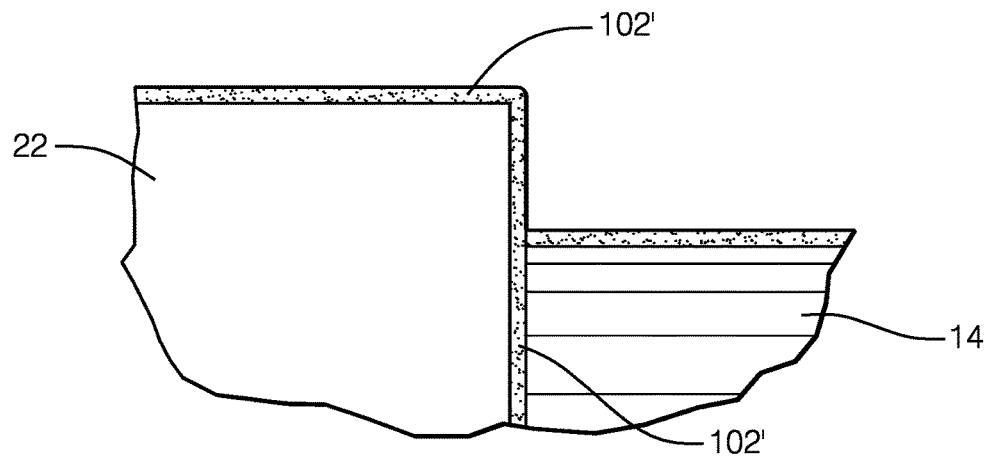
FIG. 2 is a schematic depiction in a cross-sectional view of an example embodiment of a coated portion of a terminal wire assembly.

In some embodiment, the process parameters of the application, and/or the properties of the coating composition (e.g., viscosity) can be adjusted or maintained to promote formation of a conformal coating at the interface between the lead and the terminal, including any gaps between the interface and the lead, or in adjacent areas (e.g., to promote coverage or filling of any voids 42 in strands 15). In some embodiments, a conformal coating can be defined as one that conforms to the contours of the underlying substrate rather than fill gaps and levelling to form a level surface. In some embodiments, a coating such as a conformal coating can have a thickness in a range having a lower end of 50 μm, more specifically 75 μm, and even more specifically 100 μm, and an upper limit of 5 mm, more specifically 2 mm, more specifically 1 mm, and even more specifically 0.5 mm. For jet application as described above, useful viscosities for promoting conformal coatings can include those viscosity ranges mentioned above. An example of a coating such as a conformal coating is schematically depicted in FIG. 2, where a substrate comprising a portion of the conductive core 14 and the terminal 22 are coated with a coating 102'.

After application, the coating composition is cured via a free radical polymerization reaction of the oligomer and monomer. Free radical polymerization reactions can be initiated by the formation of free radicals in the reaction mixture, which react with the double bonds on the monomer or at the terminus of the oligomer to initiate the free radical cascading polymerization reaction. The free radical initiators can be formed by an added chemical free radical initiator species, by application of actinic radiation, or both chemically and radiologically. In some embodiments, an actinic radiation emitter 104 such as a UV light source can be integrated with coating applicator 100 as depicted in FIG. 1, facilitating sequential application of the coating composition followed by exposure to UV light. In some embodiments, exposure of the applied coating to UV light can activate a UV-activatable free radical initiator.

The following examples are intended to further describe and not to limit the present disclosure.

EXAMPLES

Example 1

Coating compositions a specified in Table 2 and 3 using oligomers as specified in Table 1 were applied to 0.75 mm2 G&G cable which was terminated with a Delphi terminal #13781251, using a robotic jet coater and cured using an LED UV lamp emitting at 395 nm. The coatings were applied to 0.75 mm$^2$ terminated aluminum cable leads in approx. 2-3 seconds without contamination of the mating portion of the terminal. Conformal coatings 9108F (made by EMS) and Dymax 9102 (made by Dymax), known to be used commercially for printed circuit board applications, were obtained from commercial electrical coatings suppliers. Experimental bimodal coating compositions containing oligomers and monomers as specified below were prepared by mixing the oligomers and the monomers along with a UV-activated free radical initiator H-NU LT5 UV from Spectra. Comonomers were added to both lower the oligomer viscosity to a target level, and provide functional groups which could be used for adhesion, crosslinking, or flexibilization.

TABLE 1

| Oligomer | Description |
| --- | --- |
| 1 | 81 wt. % of an aliphatic polyester-based urethane diacrylate oligomer, 19 wt. % 2-(2-ethoxyethoxy)ethyl acrylate |
| 2 | Difunctional low-$T_g$ aliphatic urethane acrylate oligomer |
| 3 | Polybutadiene dimethacrylate oligomer |
| 4 | Adhesion-promoting mono-functional acrylic oligomer |

TABLE 2

| Sample # | Oligomer 1 (wt. %) | Lauryl Acrylate (wt. %) | 2-Ethylhexyl Acrylate (wt. %) | Ethoxyethoxyethyl Acrylate (wt. %) | Acrylic Acid (wt. %) | Viscosity at 40° C. |
| --- | --- | --- | --- | --- | --- | --- |
| 1 | 70 | 20 | | | 10 | 343 |
| 2 | 65 | | | 25 | 10 | 244 |
| 3 | 90 | | | 10 | | 1763 |
| 4 | 70 | | 20 | | 10 | 622 |
| 5 | 70 | | 10 | | 20 | 238 |
| 6 | 65 | | 35 | | | 145 |

TABLE 3

| Sample # | Oligomer 2 (wt. %) | Oligomer 3 (wt. %) | Oligomer 4 (wt. %) | 2-Ethylhexyl Acrylate (wt. %) | Acrylic Acid (wt. %) | Viscosity at 40° C. |
| --- | --- | --- | --- | --- | --- | --- |
| 7 | 60 | | | | 40 | 1550 |
| 8 | | 70 | | 30 | | 820 |
| 9 | | 35 | 35 | 30 | | 510 |

A modified version of a test known in the automotive industry as PG18C was used in this work, where the samples were twice exposed to 100 thermal cycles of −40 to 130° C. followed by 6 days of 8 hour salt spray and 16 hour standing in a humid environment. Terminal performance was assessed by measurement of the electrical resistance increase of the double-ended terminated lead over the course of the test, with less than 7.5 mohm increase required to pass. Ten coated assemblies for each sample were subjected to the testing. The test results are shown in Table 4.

TABLE 4

| Sample # | Δmohm (minimum) | Δmohm (average) | % of samples having Δmohm less than 7.5 mohm |
| --- | --- | --- | --- |
| Comp. A (9108F) | 2.8 | 5.2 | 0 |
| Comp. B (9102) | 5.5 | 18.7 | 0 |
| 1 | 0.5 | 1.8 | 100 |
| 2 | 0.9 | 2.0 | 100 |
| 3 | 2.3 | 6.9 | 70 |
| 4 | 2.8 | 4.9 | 90 |
| 5 | 2.8 | 8.3 | 50 |

As can be seen from the results in Table 4, terminals coated with the coatings of the invention overall had significantly improved performance against the comparison coatings with respect to minimum resistance gain, average resistance gain, and percent of samples with <7.5 mohm resistance increase, with Samples 1 and 4 exhibiting the best results.

Additionally, it was found that topical application of oils can extend the passing performance on PG18C to three cycles from the two cycles used above for the results in Table 4. In a separate study, ten coated assemblies with Sample #1 were treated with various oils and tested in a two-cycle or three-cycle protocol. The results are set forth in Table 5, demonstrating that passage of the three-cycle test can be achieved.

TABLE 5

| Oil | % Passing 2 cycles | % Passing 3 cycles |
| --- | --- | --- |
| None | 75 | 33 |
| Cortec | 100 | 80 |
| Mineral | 100 | 100 |
| Nye531J | 100 | 100 |
| Nye561J | 100 | 80 |
| Richards562CPD | 100 | 0 |

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A wire terminal assembly, comprising:
 a conductive cable core comprising a first metal;
 a conductive terminal connected to the conductive cable core along a conductive connection interface, the conductive terminal comprising a second metal; and
 a coating over the conductive connection interface derived from the free radical addition polymerization of a liquid coating composition applied over the conductive connection interface, said liquid coating composition comprising:
 (1) an oligomer comprising at least two active unsaturated bonds, and
 (2) a monomer comprising an unsaturated bond.

2. The assembly of claim 1, wherein the oligomer is the polymerizate of a reaction mixture comprising a polyisocyanate, a polyol, and a hydroxy-functional acrylate.

3. The assembly of claim 2, wherein the oligomer includes aliphatic groups derived from aliphatic polyols or aliphatic polyisocyanates.

4. The assembly of claim 2, wherein the polyol includes a hydroxy-terminated polyester.

5. The assembly of claim 1, wherein the monomer comprises a (meth)acrylate group.

6. The assembly of claim 1, wherein the first metal and the second metal have different electrode potentials.

7. The assembly of claim 6, wherein the terminal comprises tin-plated copper, and the cable core comprises aluminum.

8. The assembly of claim 1, wherein the cable further comprises an electrically insulating outer cover, from which a lead portion of the cable core extends, and wherein the conductive connection interface comprises a crimp connection of a structure of the terminal onto the lead portion of the cable core and a crimp connection onto the electrically insulating outer cover.

9. The assembly of claim 8, wherein the coating covers the conductive connection interface and the lead.

10. The assembly of claim 9, wherein the coating further covers a portion of the cable outer cover adjacent to the lead portion of the cable core.

11. The assembly of claim 1, wherein the coating has a cured thickness of 50 μm to 5 mm.

12. The assembly of claim 1, wherein the coated assembly is treated with a corrosion-inhibiting oil.

13. The assembly of claim 1, wherein the coated assembly exhibits a change in resistance of less than 7.5 micro ohms between the terminal and the conductive cable core after exposure to three test cycles, each test cycle comprising 100 thermal cycles comprising 15 minutes at −40° C. followed by 15 minutes at 130° C., 4 salt exposure cycles comprising 2 hours of salt mist/spray at 35° C. followed by 22 hours at 93% relative humidity at 40° C., and 1 conditioning period comprising 72 hours at 45-55% relative humidity at 23° C.

14. The assembly of claim 1, wherein the coating composition further comprises a UV-activated free radical initiator.

15. A method of making a wire terminal assembly, comprising
connecting a conductive terminal to a conductive cable core along a conductive connection interface; and
depositing a liquid coating composition over the conductive connection interface, said liquid coating composition comprising:
(1) an oligomer comprising at least two active unsaturated bonds, and
(2) an acrylic monomer; and
curing the deposited liquid coating composition.

16. The method of claim 15, wherein the curing is carried out by exposing the coated substrate to ultraviolet light.

17. The method of claim 16, comprising depositing the coating with a jet coating apparatus.

18. The method of claim 17, wherein the coating composition has a viscosity of 300-1000 centipoise at 40° C.

19. The method of claim 17, wherein the jet coating apparatus deposits the coating composition in drop sizes of 0.25 ml-2 ml.

20. The method of claim 15, further comprising treating the coated substrate with a corrosion-inhibiting oil.

* * * * *